(12) United States Patent
Scopelite et al.

(10) Patent No.: US 11,015,726 B2
(45) Date of Patent: May 25, 2021

(54) BALL CAGE WITH DIRECTED FLOW PATHS FOR A BALL PUMP

(71) Applicant: Graco Minnesota Inc., Minneapolis, MN (US)

(72) Inventors: John R Scopelite, Louisville, OH (US); Ralph C Angiuli, Canfield, OH (US); Charles J Wheeler, New Philadelphia, OH (US)

(73) Assignee: Graco Minnesota Inc., Minneapolis, MN (US)

(*) Notice: Subject to any disclaimer, the term of this patent is extended or adjusted under 35 U.S.C. 154(b) by 250 days.

(21) Appl. No.: 15/765,927

(22) PCT Filed: Nov. 10, 2016

(86) PCT No.: PCT/US2016/061253
§ 371 (c)(1),
(2) Date: Apr. 4, 2018

(87) PCT Pub. No.: WO2017/083475
PCT Pub. Date: May 18, 2017

(65) Prior Publication Data
US 2018/0291891 A1    Oct. 11, 2018

Related U.S. Application Data

(60) Provisional application No. 62/255,848, filed on Nov. 16, 2015, provisional application No. 62/255,749, (Continued)

(51) Int. Cl.
*F04B 15/02* (2006.01)
*F16K 15/04* (2006.01)
(Continued)

(52) U.S. Cl.
CPC ............ *F16K 15/048* (2013.01); *F04B 15/02* (2013.01); *F04B 19/22* (2013.01);
(Continued)

(58) Field of Classification Search
CPC ...... F16K 15/048; F16K 15/183; F16K 15/04; F04B 15/02; F04B 53/1007;
(Continued)

(56) References Cited

U.S. PATENT DOCUMENTS 1,430,986 A    10/1922  Hallman
1,513,985 A    11/1924  Gunn et al.
(Continued)

FOREIGN PATENT DOCUMENTS

CA    2122694 C    5/1997
CA    1256377 A    6/2000
(Continued)

OTHER PUBLICATIONS

Machine Translation of CH 597513 A5 patent to Seiler, Hanspeter published Apr. 14, 1978.*

(Continued)

*Primary Examiner* — Peter J Bertheaud
*Assistant Examiner* — Dnyanesh G Kasture
(74) *Attorney, Agent, or Firm* — Kinney & Lange, P.A.

(57) ABSTRACT

A disclosure pertains to a reciprocating pump configured for pumping fillers or aggregates or cementitious material and the like.

8 Claims, 9 Drawing Sheets

Related U.S. Application Data filed on Nov. 16, 2015, provisional application No. 62/253,733, filed on Nov. 11, 2015.

(51) Int. Cl.
*F04B 53/12* (2006.01)
*F04B 19/22* (2006.01)
*F04B 53/10* (2006.01)
*F16K 15/18* (2006.01)

(52) U.S. Cl.
CPC ...... *F04B 53/1007* (2013.01); *F04B 53/1087* (2013.01); *F04B 53/126* (2013.01); *F04B 53/101* (2013.01); *F16K 15/04* (2013.01); *F16K 15/183* (2013.01)

(58) Field of Classification Search
CPC .... F04B 53/1087; F04B 19/22; F04B 53/126; F04B 53/101; F04B 15/023; F04B 2015/026; Y10T 137/7914; Y10T 137/791
USPC .......................................................... 417/554
See application file for complete search history.

(56) References Cited

U.S. PATENT DOCUMENTS

| | | |
|---|---|---|
| 1,543,179 A | 6/1925 | Miller et al. |
| 1,714,398 A | 5/1929 | O'Bannon |
| 1,714,434 A | 5/1929 | O'Bannon |
| 1,931,938 A | 10/1933 | Pippin |
| 2,007,888 A * | 7/1935 | Ball ........................ F04B 15/02 417/427 |
| 2,061,480 A * | 11/1936 | Pigott ...................... F16K 15/06 137/533.21 |
| 2,274,968 A | 3/1942 | O'Bannon |
| 2,309,839 A | 2/1943 | Gardner |
| 2,362,139 A | 11/1944 | Kelly |
| 2,682,281 A | 6/1954 | Ecker |
| 2,723,679 A | 11/1955 | Harris et al. |
| 2,734,667 A | 2/1956 | Conklin |
| 3,050,002 A | 8/1962 | Harris |
| 3,059,667 A | 10/1962 | Coceano |
| 3,077,204 A | 2/1963 | Bennett et al. |
| 3,263,239 A | 8/1966 | Edwards et al. |
| 3,295,822 A | 1/1967 | O'Bannon, Jr. et al. |
| 3,371,352 A | 3/1968 | Siposs et al. |
| 3,387,625 A | 6/1968 | Laure |
| 3,542,155 A | 11/1970 | Kern |
| 3,543,682 A | 12/1970 | Farrow |
| 3,620,228 A | 11/1971 | Schmid |
| 3,637,328 A | 1/1972 | Kurokawa et al. |
| 3,661,167 A | 5/1972 | Hussey |
| 3,724,496 A | 4/1973 | Secrist |
| 3,749,521 A | 7/1973 | Coone |
| 3,896,723 A | 7/1975 | Farrow et al. |
| 3,911,502 A | 10/1975 | Boretos |
| 4,061,085 A | 12/1977 | Farrow |
| 4,286,622 A | 9/1981 | Ninomiya |
| 4,287,912 A | 9/1981 | Hewett |
| 4,291,763 A | 9/1981 | Singer |
| 4,295,412 A | 10/1981 | Hachiro |
| 4,611,374 A | 9/1986 | Schnelle et al. |
| 4,667,696 A | 5/1987 | van Rensburg |
| 4,846,213 A | 7/1989 | Hutchens et al. |
| 4,955,404 A | 9/1990 | Pitzen |
| 5,061,159 A | 10/1991 | Pryor |
| 5,139,047 A | 8/1992 | Reinicke |
| 5,178,184 A | 1/1993 | Skillman |
| 5,232,014 A | 8/1993 | Hiltebrand |
| 5,245,962 A | 9/1993 | Routery |
| 5,395,219 A | 3/1995 | Hosoya et al. |
| 5,435,697 A | 7/1995 | Guebeli et al. |
| 5,567,135 A | 10/1996 | Mueller |
| 5,577,896 A | 11/1996 | Harada |
| 5,593,289 A | 1/1997 | Tarpley |
| 5,593,292 A | 1/1997 | Ivey |
| 5,649,360 A | 7/1997 | Schwarz |
| 5,653,258 A | 8/1997 | Schwarz |
| 5,785,083 A * | 7/1998 | Tang ...................... F16K 15/04 137/533.13 |
| 5,971,015 A | 10/1999 | Gonsior |
| 5,980,224 A | 11/1999 | Regueiro |
| 5,988,994 A | 11/1999 | Berchowitz |
| 6,029,685 A | 2/2000 | Carruth |
| 6,155,806 A | 12/2000 | Andel |
| 6,267,137 B1 | 7/2001 | Watanabe et al. |
| 6,398,317 B1 | 6/2002 | Burgdorf et al. |
| 6,679,684 B2 | 1/2004 | Kominami |
| 6,685,451 B1 | 2/2004 | Ivey |
| 6,764,286 B2 | 7/2004 | Hunnicutt et al. |
| 6,830,441 B1 | 12/2004 | Williams |
| 7,028,647 B2 | 4/2006 | Styron |
| 7,444,990 B1 | 11/2008 | Fisher et al. |
| 8,146,618 B2 | 4/2012 | Szuster |
| 8,251,066 B1 * | 8/2012 | Ho ........................ A61M 16/20 128/207.12 |
| 8,579,610 B2 | 11/2013 | Perkins, Jr. et al. |
| 8,794,938 B2 | 8/2014 | Frey |
| 9,140,245 B2 | 9/2015 | Nakai et al. |
| 9,394,900 B2 | 7/2016 | Roman et al. |
| 10,100,829 B2 | 10/2018 | Ford |
| 2004/0120838 A1 * | 6/2004 | Savidge ............. F04B 39/1006 417/559 |
| 2005/0121084 A1 | 6/2005 | Andersson |
| 2005/0257927 A1 | 11/2005 | Coyes et al. |
| 2006/0188380 A1 * | 8/2006 | Strong .................. F04B 53/126 417/555.1 |
| 2010/0260404 A1 | 10/2010 | Ohishi |
| 2010/0269928 A1 * | 10/2010 | Ford ....................... F16K 15/04 137/533.11 |
| 2013/0142684 A1 * | 6/2013 | Asou ..................... F16K 15/048 417/559 |
| 2014/0026987 A1 | 1/2014 | Ayers et al. |
| 2015/0059882 A1 | 3/2015 | Kraus et al. |
| 2015/0292492 A1 * | 10/2015 | Kim ...................... F04B 1/0452 417/505 |
| 2016/0069344 A1 * | 3/2016 | Carey ................. F04B 53/1007 417/213 |
| 2018/0066652 A1 | 3/2018 | Ford |

FOREIGN PATENT DOCUMENTS

| | | | |
|---|---|---|---|
| CH | 597513 A5 * | 4/1978 | ........... F04B 53/101 |
| CN | 87211361 U | 9/1988 | |
| CN | 2048906 U | 12/1989 | |
| CN | 2065708 U | 11/1990 | |
| CN | 2811601 Y | 8/2006 | |
| JP | 2000035146 A | 2/2000 | |
| WO | 2012149005 A3 | 3/2013 | |

OTHER PUBLICATIONS

Third Chinese Office Action for Chinese Patent Application No. 2016800657646, dated Jul. 31, 2020, 16 pages.
Third Chinese Office Action for Chinese Patent Application No. 2016800658634, dated Aug. 3, 2020, 17 pages.

* cited by examiner

BALL CAGE WITH DIRECTED FLOW PATHS FOR A BALL PUMP

CROSS-REFERENCE TO RELATED APPLICATIONS

This application is a National Stage application under 35 U.S.C. 371 ("371 Application") of International Patent Application No. PCT/US2016/061253 filed Nov. 10, 2016, which claims the benefit of U.S. Provisional Patent Application No. 62/255,848 filed Nov. 16, 2015, U.S. Provisional Patent Application No. 62/255,749 filed Nov. 16, 2015, and U.S. Provisional Patent Application No. 62/253,733 filed Nov. 11, 2015, all of which are herein incorporated by reference in their entirety.

STATEMENT REGARDING FEDERALLY SPONSORED RESEARCH OR DEVELOPMENT

Not applicable.

TECHNICAL FIELD

The instant disclosure pertains to a pump. More particularly, the disclosure pertains to a reciprocating pump for pumping an aggregate.

BACKGROUND

Two ball piston pumps have not traditionally been used for pumping heavy fillers or aggregates or cementitious material and the like. Problems associated with restricted flow passages as well as the inability of ball check valves to seal properly in a heavily aggregate filled material are common. When cementitious material is put under pressure the water or fluid contained within the material can separate out from the aggregate portion of the material which leads to a compressed or hardened mass that is no longer flowable, and it is considered packed out. Packed out material prevents the pump from working. Additionally, pumping heavily filled material requires valves, e.g., check valves, that seal adequately to prevent water or fluid within the material from separating out.

U.S. Pat. No. 1,430,986 to Hallman discloses means for mounting a standing valve in a deep well pump outfit as a means of guarding against leakage, looseness, displacement and other inconveniences incident to the use of conventional forms of standing valve mountings and necessitating the withdrawal of the tubing in order to readjust or repair or replace the parts, and hence involving a great loss of time and heavy expense due to the enforced idleness of the pump; and more particularly to provide a collar standing valve wherein the valve with its cage and related parts are mounted in and carried by a collar adapted to form a coupling between the working barrel and the pipe anchor under such conditions as to provide against any possibility of a detachment or displacement of the elements due to the jarring of the apparatus.

U.S. Pat. No. 1,714,398 to O'Bannon relates to a class of valves used in oil pumping operations where very high pressures are present and the case is adapted for use either as a standing or a working valve. Disclosed is a valve case formed at its lower portion with a series of longitudinal ribs having radial contact faces extending from a valve seat and terminating a point below a transverse stop bar disposed to limit the opening travel of the valve. The chamber surrounding the bar has deflecting walls at its upper end so that the circumferential current of liquid passing upward through the spaces between the ribs has a free passage about the bar and is then directed into a solid stream entering the outlet pipe.

U.S. Pat. No. 1,714,434 to O'Bannon teaches a working barrel designed for a deep well pump wherein a proper packing and valve operation is required commensurate with the pressures present in the liquid to be pumped. Disclosed is a working barrel with a traveling valve having an upwardly extending delivery conduit with a packing interposed between the barrel and conduit, and a tension head slidingly mounted upon the upper portion of the conduit to engage the packing. The packing is disclosed as having bearing surfaces for sliding contact with both the conduit from the traveling valve and the inner face of the barrel. The head is provided with a recess to receive a compression spring disposed beneath the delivery of the conduit and with a reduced wall extending upward above the delivery to create a proper current of liquid for washing clear any sediment or abrasive matter which might settle into the recess and eventually affect the packing member. The valve casing is disclosed as being adapted for use for either the traveling or standing valve and provided at its opposite ends with coupling connections. The casing is formed with a series of radial ribs having contact faces extending upward from the valve seat and a stop bar extending transversely above the faces within an enlarged portion of the casing.

U.S. Pat. No. 2,274,968 to O'Bannon pertains to ball-and-seat valves, and particularly to a "blind cage" valve, which is adapted for use in pumping strings employed in deep wells such as oil wells and the like. A blind cage valve is disclosed as having features of construction and arrangement of the parts such that normal wear and tear on the parts is reduced and their useful life correspondingly increased. Also disclosed are working parts which are removable from the cage or housing elements and easily replaced when worn.

U.S. Pat. No. 2,682,281 to Ecker discloses ball check valves and, more particularly, a ball valve provided with a cage having a flexible and resilient ball guide. The flexible and resilient ball guide includes circumferentially spaced guide elements adapted to receive the ball valve therebetween, the circumferential spaces between the guide elements providing passages past the ball valve through which fluid may flow when the ball valve is in its open position. Also disclosed is a unitary ball guide wherein the circumferentially spaced guide elements are interconnected so that the ball guide may be readily assembled with, or disassembled from the body of the ball valve cage. The guide elements of the ball guide are interconnected by arcuate connecting elements which co-operate with the guide elements at one end of the ball guide to form an annulus at said one end of the ball guide. To facilitate assembly of the ball guide with the body of the ball valve cage, at least the arcuate connecting elements defining the annulus are formed of a material which is considerably more flexible and softer than the guide elements.

U.S. Pat. No. 3,059,667 to Coceano relates to a check valve, and more particularly, to check valves for use at temperatures in excess of 649° C. (1200° F.) and below −118° C. (−180° F.). For controlling the flow of high temperature gases or liquid metals, chemically inert materials having high melting points are built into the structural design of the check valves. The disclosure provides a check valve for operating at temperatures of 982° C. (1800° F.) with liquid metal passing therethrough. Also provided is a check valve having a ball and seat that will not fuse when used to control the flow of liquid metals. Also disclosed is a check valve comprising a ball and a seat wherein the mating contacting surfaces of the ball and seat will not corrode from the flow therethrough of liquid metal at high temperatures thereby eliminating leakage through the valve when the ball and seat are engaged in a mating relationship. Additionally, a check valve capable of operating in eutectic sodium potassium mixtures of 982° C. (1800° F.), and another that may be used to control the flow of very low temperature liquids or gases are also disclosed.

U.S. Pat. No. 3,295,822 to O'Bannon, Jr., et al. teaches a closed valve cage having improved internal ball guide ribs and improved fluid by-pass flow passages internally of the valve cage. Also provided is a closed valve cage having improved strength characteristics to prevent wall failure when the cage wall is subjected to high pressure differentials. The disclosure includes a closed valve cage having relatively large fluid flow passages through the cage to prevent exceedingly high fluid flow rates through the cage when the valve is in the open position, thereby preventing the ball valve from being forced against the various parts of the cage at undesirably high speeds. Also disclosed is a closed valve cage having one or more internal flow passages therethrough, diverging upwardly and outwardly from the valve seat whereby the valve ball is slowed as it is moved upwardly into the open position by movement of fluid upwardly through the valve cage. Also provided is a blind valve cage that has one or more internal evenly annularly spaced apart milled out grooves extending at an angle to the axis of the cage and that function as fluid by-pass passages through the cage when the ball valve is in the open position. A closed valve cage including an improved shoulder against which a valve seat can be positioned is also disclosed.

U.S. Pat. No. 3,724,496 to Secrist pertains to a cage and guide construction for a ball-type valve, wherein the cage has spaced apart internal shoulders having confronting grooves. The guide pieces lie between the shoulders and have lips received in the grooves to lock them in place. The guide pieces can be either metal or elastomer and are not distorted when inserted or removed.

U.S. Pat. No. 5,061,159 to Pryor discloses a pump apparatus for moving fluid, such as drilling mud. The pump has a special designed fluid end of a configuration that reduces stress riser and therefore reduces the frequency of broken pumps. The pump has a cylindrical liner within which a special piston reciprocates. A stationary discharge valve of special design is connected to discharge fluid from the pump working chamber. A traveling valve is included in the piston and supplies fluid to the working chamber of the pump. The traveling and stationary valves each have a seal that also forms part of a valve seat. Each of the valve elements is a hollow ball and each ball is sealingly seated against the seat. The pump liner, piston, and discharge valve assembly are all axially aligned and can be easily removed from the discharge end of the pump.

U.S. Pat. No. 5,232,014 to Hiltebrand relates to a check valve having a spherical closing member arranged in a flow duct of a valve body. The flow duct includes guide ribs with stop surfaces. The spherical closing member is displaceable by medium flowing through the valves between the stop surfaces and a sealing portion. An annular portion is arranged between the sealing portion and the guide ribs. The annular portion has an internal bore which is slightly greater than the diameter of the spherical closing member. Starting from the equator of the spherical closing member resting against the sealing member, the partial length of the internal bore of the annular portion in flow direction of the medium is ⅕ to ½ of the diameter of the spherical closing member.

U.S. Pat. No. 5,593,289 to Tarpley teaches plunger valve assemblies for reciprocating sucker rod operated subsurface pumps and specifically as to the traveling valves and standing valves. The traveling valve includes a valve body having an inwardly-directed lip at the bottom with the valve seat, ball and cage inserted from the top of the valve body. Further the standing valve has a closed cage formed in the upper portion thereof which is threaded into the bottom of the pump barrel, thus placing the closed cage of the standing valve and the traveling valve in closer proximity at the bottom of the downstroke than prior such pumps.

U.S. Pat. No. 5,593,292 to Ivey pertains to a valve cage having a tubular side wall with progressively diminishing thickness between the seat and the stop means, whereby the bore is tapered and upwardly enlarging in that interval. Therefore the flow area between the ball provided in the bore and the side wall increases as the ball ascends. The side wall has ball guide ribs which project inwardly and increase in height at the same rate as the wall thickness diminishes, so that the ribs form a race of constant diameter, for guiding the ball as it moves vertically and preventing it from moving laterally. The ball stop is positioned at the top of the cage and the external thread for connection with the pump barrel is positioned intermediate the ends of the cage. This arrangement enables the seats of the travelling and standing valves to come close together at the bottom of the down stroke of the plunger. At their upper ends, the ball guide ribs join to form a ball stop that has a hemispherical configuration, to better distribute contact between the valve ball and the stop.

U.S. Pat. No. 5,971,015 to Gonsior discloses a check valve having a housing and a ball movably disposed therein on a guide member and driven by a flowing medium, and able to come in contact with a seat due to the force of gravity. The check valve is designed such that, even in case of low pressure differences or small back-flows of the flowing medium, a secure blocking is assured. The guide means is configured as a ridge of plastic which slopes toward the seat, on whose upper edge the ball can roll onto or into the seat, and the ridge is disposed entirely within the first housing member.

U.S. Pat. No. 6,029,685 to Carruth relates to a cage assembly for ball check valves having an insert comprising a unitary structure having a passageway therethrough. A ball is positioned in the passageway of the insert for movement between two positions one of which secures the passageway against the flow of fluids therethrough. The insert is positioned in an insert receiving cavity formed in the lower end of an upstream housing. A downstream housing has a shoulder which engages the insert to secure the insert in the cavity. The downstream housing is secured to the upstream housing by friction welding or by inertia welding.

U.S. Pat. No. 6,685,451 B1 to Ivey teaches a valve assembly for an oil pumping system including a shell, a seat affixed in a lower end of the shell, a ball positioned within the shell and having a diameter greater than a diameter of the seat, and a cage positioned within the interior passageway of the shell. The cage has a first ported area and a second ported area on opposite sides of a ball retaining system. An elastomeric ring or a resilient member is positioned against a top of the cage.

U.S. Pat. No. 6,830,441 B1 to Williams pertains to a downhole pump having a barrel with a reciprocating plunger therein having at least one valve. The valve has a cage, a seat and a ball. The cage has a passageway extending between two ends, with the passage including a ball chamber. The ball chamber is between a perforated member and a stop. The ball is located in the ball chamber between the perforated member and the seat, which abuts the stop. The ball is movable along a raceway. The raceway has ribs with channels therebetween. The raceway skews away from a longitudinal axis of the ball chamber from the seat toward the perforated member. The raceway can be made of a material that is either harder or softer or the same as the hardness of the inner wall of the ball chamber. In another embodiment, the valve has a throat with a stop for receiving a seat. The ball chamber has portions that are hardened. The clearance between the ball and the hardened portions of the ball chamber is at least twice as large as the clearance between the ball and the throat.

U.S. Pat. No. 8,579,610 B2 to Perkins, Jr., et al. discloses a downhole pump having a barrel and a plunger. The barrel has a first one-way valve and the plunger has a second one-way valve. The plunger is of the box end type. The pump prevents or minimizes gas lock by achieving high compression in the compression chamber between the two valves. The second valve is located close to the bottom end of the plunger. In the second valve, the valve seat is in contact with the seat plug, which seat plug has a seal. Alternatively, the valve seat is incorporated into the seat plug, which seat plug also has a seal. The plunger lacks reliefs at the bottom end and thereby achieves tight tolerances with the barrel, further contributing to high compression.

Accordingly, there exists a need for two ball piston pumps for pumping heavy fillers or aggregates or cementitious material and the like that are specifically designed to reduce the likelihood of creating compressed or hardened and packed out material. Additionally, in such piston pumps there exists a need for valves that seal adequately to prevent water or fluid within the material from separating out when pumping heavily filled material.

SUMMARY

A non-limiting exemplary embodiment of a pump includes an outlet port, an outlet section in fluid communication with the outlet port, an inlet port, a ball cage, a seat, and a substantially hollow middle section extending between the outlet section and the ball cage. The ball cage includes a ball disposed therewithin, spaced apart opposing first and second ends, a first opening in the first end of the ball cage, the first opening in fluid communication with the inlet port, and a second opening in the second end of the ball cage. The ball cage is configured for uninhibited displacement of the ball therewithin. The middle section is in fluid communications with the outlet section and with the second opening. A pressure applied on the ball in a first direction sealingly seats the ball on the seat, thereby inhibiting flow of material across the first opening. A pressure applied on the ball in a second direction unseats the ball from the seat and positions the ball on at least a portion of the second opening. When the ball is positioned at the second opening, at least one passage extending between the first and second openings is defined at least in part by the ball. The cross-sectional area of the at least one passage decreases with increasing distance from the first opening. Consequently, a velocity of material flowing through the at least one passage increases with increasing distance from the first opening. The increase in the velocity flushes away compressed or hardened material out of the ball cage to prevent packing out.

A non-limiting exemplary embodiment of a pump includes an outlet port, an outlet section in fluid communications with the outlet port, an inlet port, an inlet section in fluid communications with the inlet port, a substantially hollow middle section extending between and in fluid communication the inlet and outlet sections, a ball cage comprising a ball disposed therewithin, a ball guide comprising a ball disposed therewithin, and a piston configured for displacing the ball guide towards and away from the ball cage.

DETAILED DESCRIPTION

One or more non-limiting embodiments are described herein with reference to the accompanying drawings, wherein like elements are designated by like numerals. It should be clearly understood that there is no intent, implied or otherwise, to limit the disclosure in any way, shape or form to the illustrated and described embodiments. While multiple exemplary embodiments are described, variations thereof will become apparent or obvious. Accordingly, any and all variants for providing functionalities similar to those of the described embodiments are considered as being within the metes and bounds of the instant disclosure.

Figure 1A:
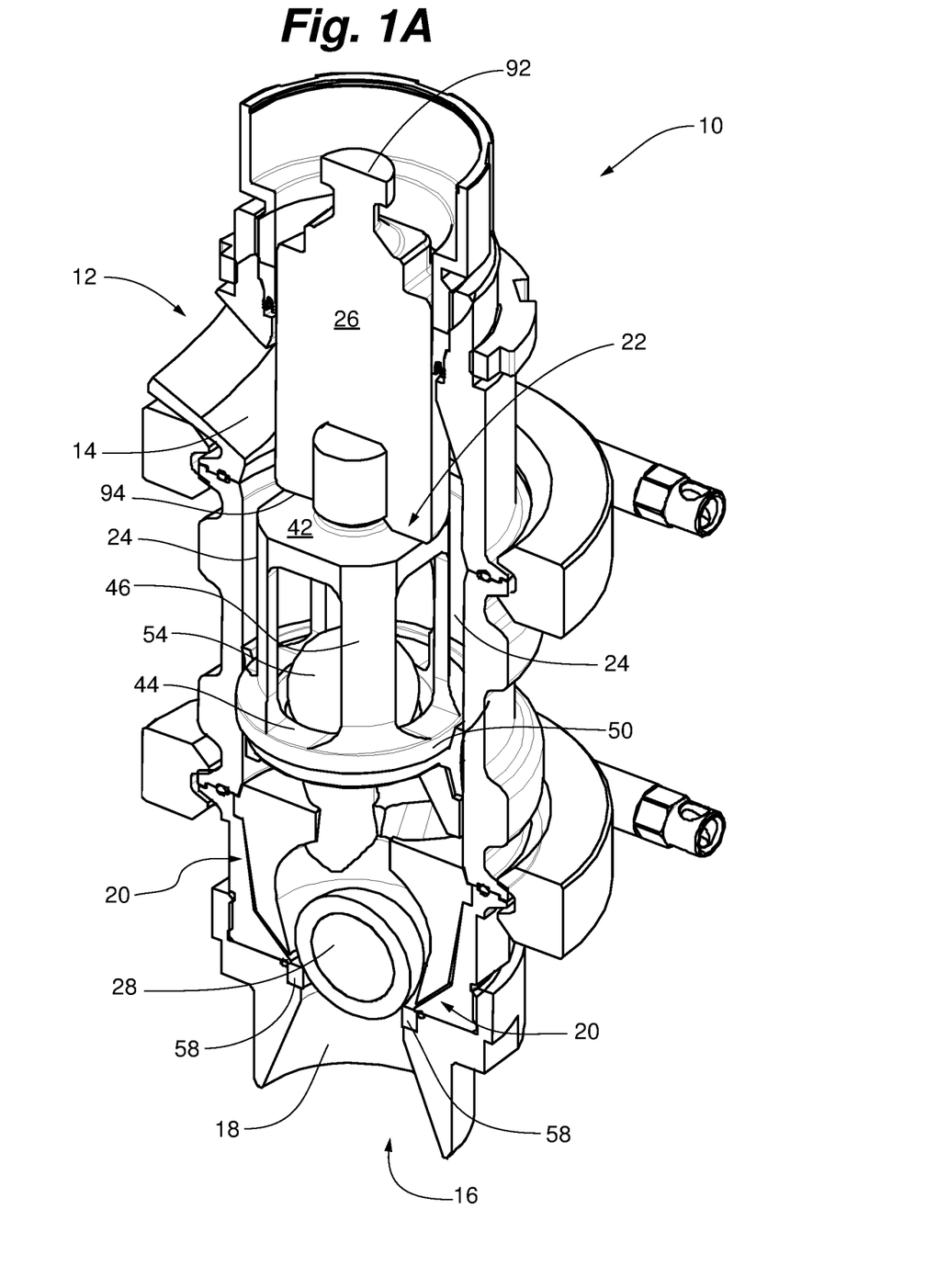
FIG. 1A is a cross-sectional perspective view of a non-limiting exemplary embodiment of a pump.
Figure 1B:
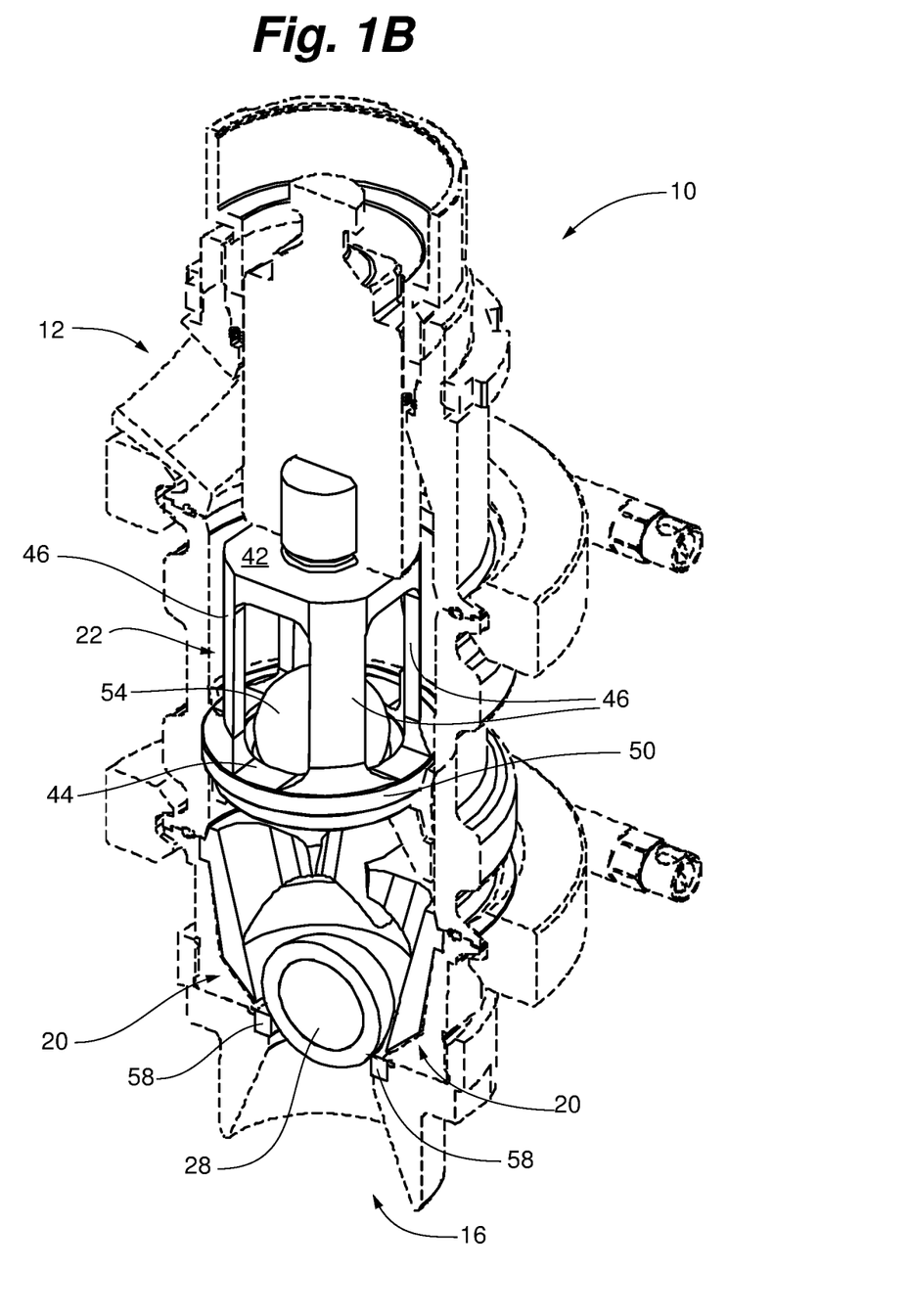
FIG. 1B is a cross-sectional perspective view illustrating non-limiting exemplary embodiments of a ball cage and a ball guide of the pump illustrated in FIG. 1A.
Figure 2A:
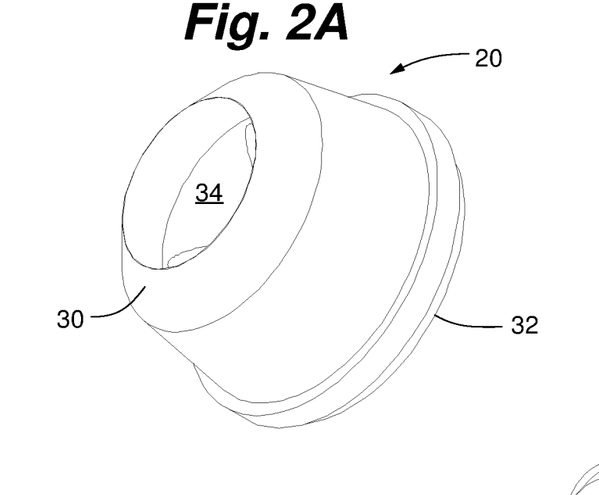
FIG. 2A is a perspective view of the ball cage illustrated in FIGS. 1A and 1B as viewed from a first end thereof.
Figure 2B:
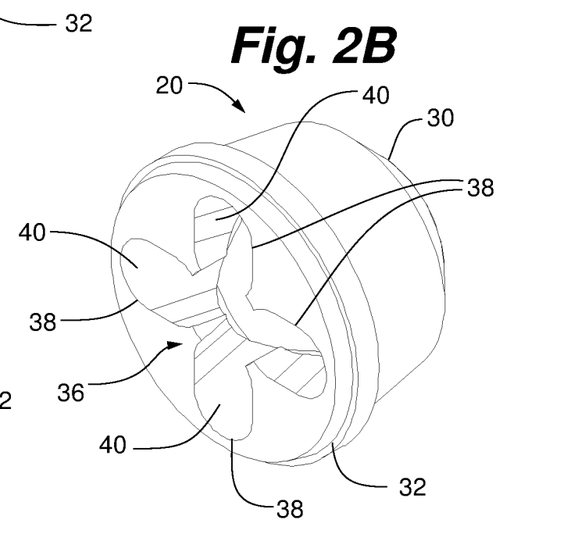
FIG. 2B is a perspective view of the ball cage illustrated in FIGS. 1A and 1B as viewed from a second end thereof.
Figure 2C:
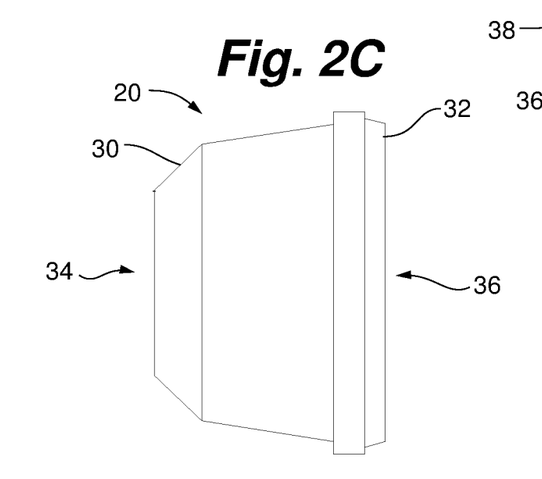
FIG. 2C is a side view of the ball cage illustrated in FIGS. 2A and 2B.
Figure 2D:
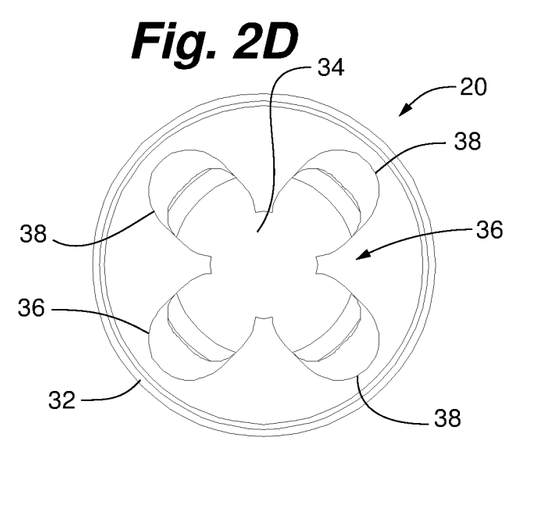
FIG. 2D is an end view of the ball cage illustrated in FIGS. 2A and 2B as viewed from the second end thereof.

FIGS. 1A and 1B illustrate a cross-sectional perspective view of a non-limiting exemplary embodiment of a pump 10. The pump 10 includes an outlet port 12, an outlet section 14 in fluid communications with the outlet port 12, an inlet port 16, an inlet section 18 in fluid communication with the inlet port 16, a ball cage 20 having at least a portion thereof disposed within at least a portion of the inlet section 18, a substantially hollow ball guide 22 configured for rectilinear displacement, a substantially hollow middle section 24, and a piston 26.

FIGS. 2A-2D illustrate various views of a non-limiting exemplary embodiment of a ball cage 20. As illustrated in FIGS. 1A and 1B, ball cage 20 includes a ball 28 disposed therewithin, spaced apart opposing first and second ends 30 and 32, respectively, a first opening 34 at the first end 30, and a second opening 36 at the second end 32. The first opening 34 is in fluid communication with the inlet port 16. In some embodiments, the ball cage 20 is configured for uninhibited movement of the ball 28 disposed therewithin.

Figure 4:
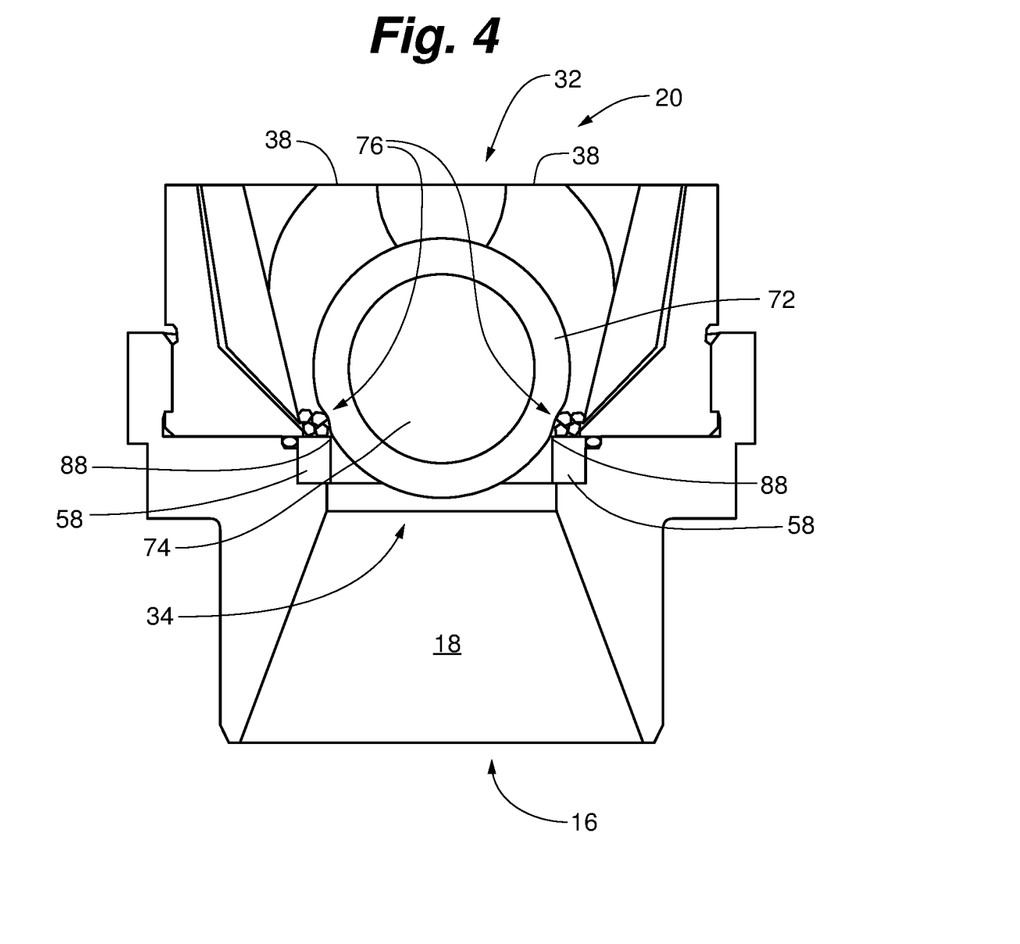
FIG. 4 is a cross-sectional side view of a non-limiting exemplary embodiment of a ball cage.
Figure 5:
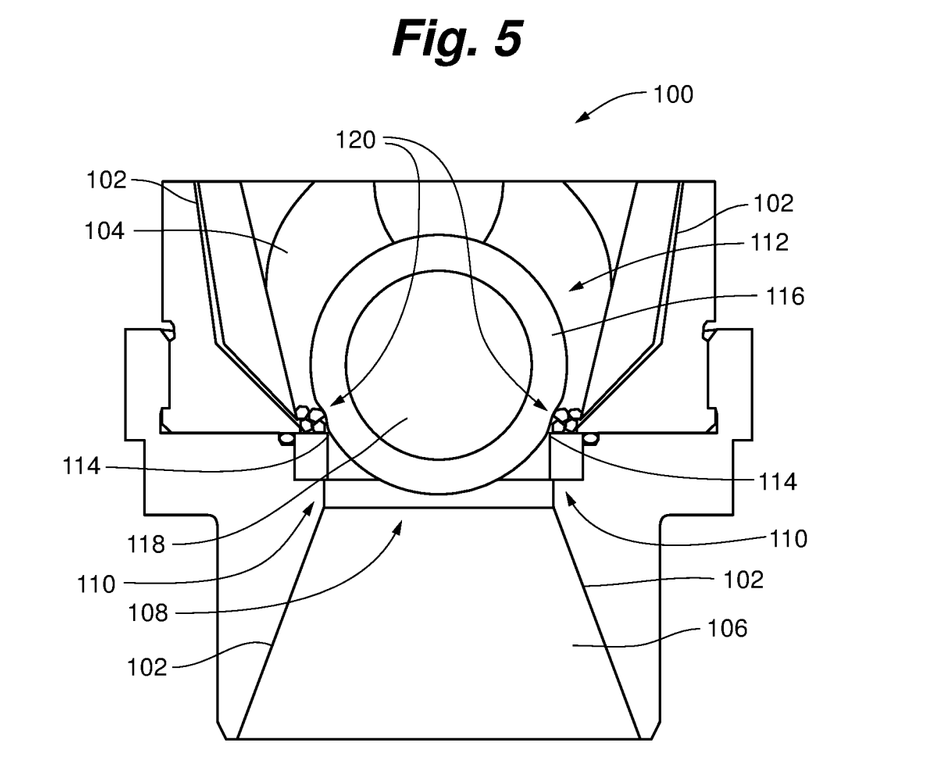
FIG. 5 is a cross-sectional side view of a non-limiting exemplary embodiment of a check valve.

In a non-limiting exemplary embodiment, the ball cage 20 is at least partially configured to operate or function as a check valve as described herein with reference to FIGS. 4 and 5. In some embodiments, a pressure applied on the ball 28 in a first direction, for example generally away from the second opening 36, displaces the ball 28 away from the second opening 36 and towards the first opening 34. And, a pressure applied on the ball 28 in a second direction, for example generally away from the first opening 34, displaces the ball 28 away from the first opening 34 and towards the second opening 36. As such, the first and second ends 30 and 32 operate as ball stops for the ball 28 disposed within the ball cage 20.

When the ball 28 is positioned over at least a portion of the second opening 36, the ball 28, at least partially, blocks the flow of material through at least that portion of the second opening 36 over which the ball 28 is positioned. Consequently, one or more smaller openings 38, defined at least in part by the unblocked portions of the second opening 36, are formed at the second end 32 of the ball cage 20. As such, at least one or more passages 40, defined at least in part by the ball 28 and a wall of the ball cage 20, extend between the first opening 34 at the first end 30 of the ball cage 20 and at least one of the one or more smaller openings 38 formed at the second end 32 of the ball cage 20. Consequently, material entering the pump 10 through the inlet port 16 flows into the ball cage 20 through the first opening 34 and along the at least one or more passages 40 to exit the ball cage 20 through the one or more smaller openings 38 at the second end 32.

In a non-limiting exemplary embodiment, a cross-sectional area of each of the one or more passages 40 decreases between the first opening 34 and the corresponding smaller opening 38 at the second end 32 of the ball cage 20. As will be apparent to one having ordinary skill in the art, such a change in the geometry of a passage will subject the material flowing therein to the venturi effect. As such, the operation and functionality of each of such one or more passages 40 is substantially similar to that of a nozzle or an orifice wherein the flow velocity of the material exiting the passage 40 through each of the smaller openings 38 in the second end 32 will be greater than the flow velocity of the material entering that passage 40, for instance at or proximate the first opening 34 of the ball cage 20. In some applications, such as in pumping fillers or aggregates or cementitious material and the like, such increases in the flow velocity may be advantageously used or applied to prevent the pump 10 from "packing out" and to "flush" or "carry along" compressed or hardened material and aggregate out of the ball cage 20.

Figure 3A:
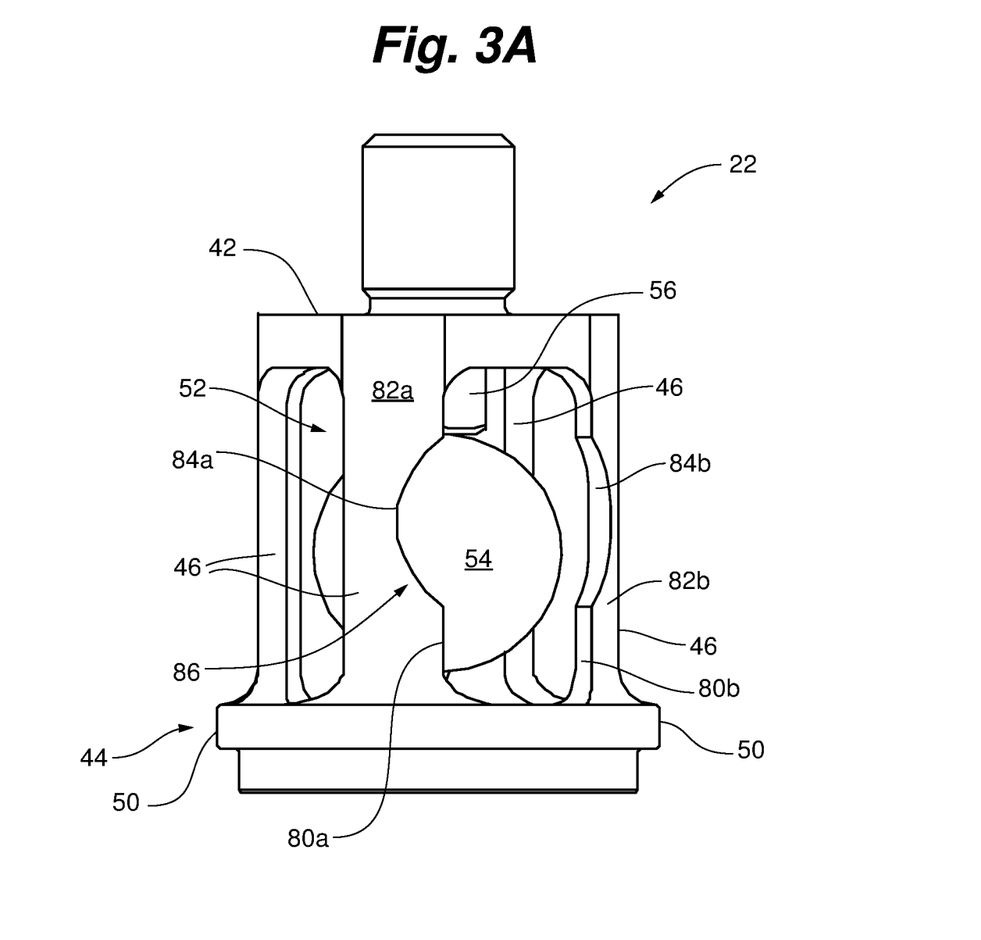
FIG. 3A is a side view of the ball guide illustrated in FIGS. 1A and 1B.
Figure 3B:
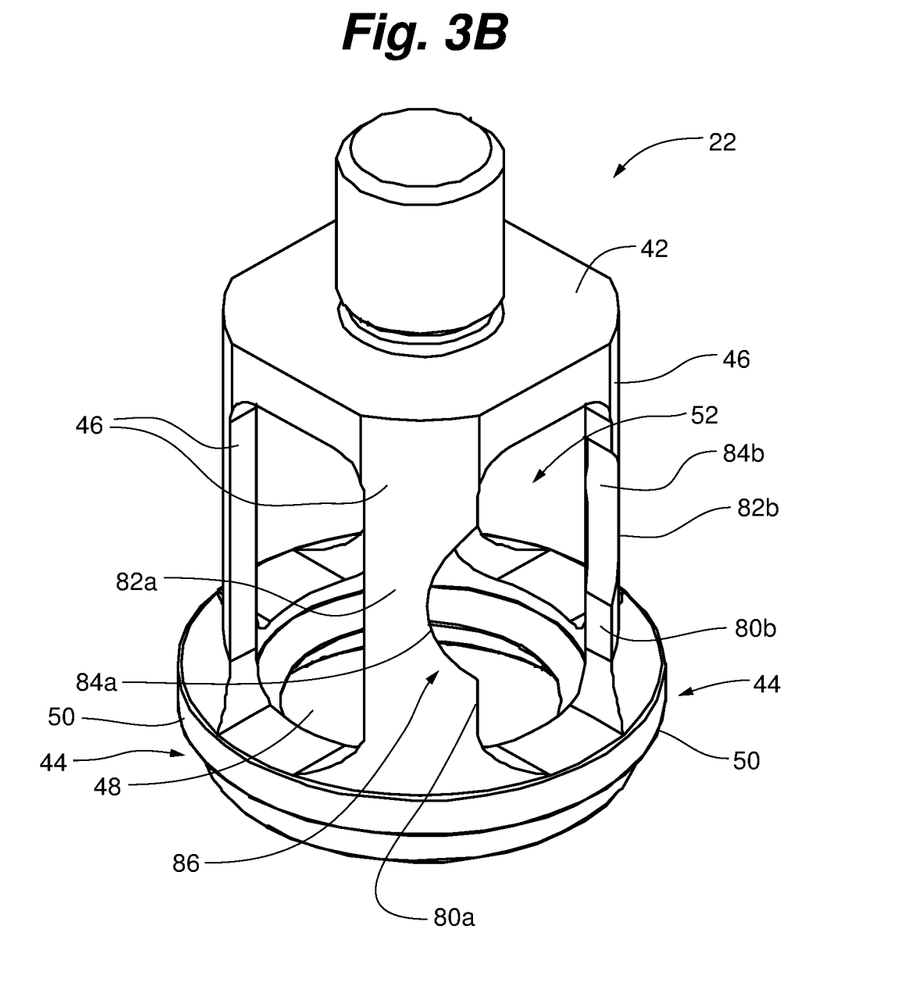
FIG. 3B is a perspective view of the ball guide illustrated in FIG. 3A without a ball disposed therewithin.

FIGS. 3A and 3B illustrate a non-limiting exemplary embodiment of the ball guide 22 defined at least in part by, spaced-apart opposing first and second ends 42 and 44, respectively, and a plurality of spaced-apart posts 46 extending between, and connecting, the first and second ends 42 and 44. The second end 44 of the ball guide 22 includes an opening 48, and at least one or more seals (not shown) along the entire outer perimeter 50 of the ball guide 22. The at least one or more seals are configured for providing a sliding-sealing interface along the entire outer perimeter 50 of the second end 44. In certain embodiments, the interior 52 of the ball guide 22 is configured for uninhibited displacement of a ball 54 disposed therewithin.

In a non-limiting exemplary embodiment, the ball guide 22 is at least partially configured to operate or function as a check valve as described herein with reference to FIGS. 4 and 5. In one such embodiment, a pressure applied on the ball 54 in a first direction, for example generally towards the opening 48, displaces the ball 54 towards the opening 48 and positions the ball 54 over the opening 48, thereby at least partially inhibiting flow of material across the opening 48. And, a pressure applied on the ball 54 in a second direction, for example generally away the opening 48, displaces the ball 54 away from the opening 48. In some embodiments, a ball stop 56 extending into the ball guide 22 from the first end 42 limits the distance that the ball 54 travels when displaced away from the opening 48 in the second end 44 of the ball guide 22. In certain embodiments, the extent to which the ball stop 56 extends into the ball guide 22 is adjustable. Such adjustability of the ball stop 56 may be used advantageously to "meter" the flow or control the amount of material flowing across the opening 48. In some embodiments, the ball stop 56 is removable. The sliding-sealing interface along the outer perimeter 50 of the second end 44 inhibits the flow of material, i.e., inhibits leakage, across the outer perimeter 50 of the second end 44 of the ball guide 22.

In some embodiments, either one or both the ball cage 20 and the ball guide 22 include a seat against which their respective balls 28 and 54 can be sealingly seated. As such, the combination of the ball cage 20, its seat, and ball 28 is configured to operate like a check valve. Likewise, the combination of the ball guide 22, its seat, and ball 54 is configured to operate like a check valve.

FIG. 4 illustrates at least a portion of the ball cage 20 proximate the first end 30 having a seat 58 disposed at the first opening 34. In a non-limiting exemplary embodiment, the seat 58 is defined at least in part by a relatively sharp-edged hard perimeter 88 against which the ball 28 is seated. In some embodiments, the perimeter 88 of the seat 58 is defined at least in part by a radiused or chamfered edge (not shown) along at least a portion thereof against which the ball 28 gets seated.

In a non-limiting exemplary embodiment, the ball 28 is a compliant ball defined at least in part by a compliant coating 72 encasing a substantially rigid core 74. In certain embodiments, the compliant coating 72 is an elastomeric material. In some embodiments, when the compliant ball 28 is seated on the perimeter 88, at least a portion 76 of the compliant coating 72 seated along or in contact with the perimeter 88 deforms at least partially around the aggregate or filler present in the flow. Consequently, at least a portion of the compliant ball 28 is displaced across the perimeter 88 to form a seal therearound to inhibit the flow of material across the first opening 34. In some embodiments, the deformation of the compliant coating 72 and displacement across the perimeter 88 enhances the integrity of the seal. In certain non-limiting exemplary embodiments, a thickness of the compliant coating 72 relative to a size of the substantially rigid core 74 is optimized for one or more of weight, sealing effectiveness, and life of the compliant coating 72.

As will be apparent to one having ordinary skill in the art, the combination of the ball cage 20 and the seat 58, such as the embodiment illustrated in FIG. 4, is configured to operate or function as a check valve. For instance, when the compliant ball 28 is displaced away from the first opening 34 and towards the second opening 36, the compliant ball 28 is un-seated from the seat 58 and material will flow across the first opening 34. Conversely, material will be inhibited from flowing across the first opening 34 when the compliant ball 28 is displaced away from the second opening 36 and towards the first opening 34 and sealingly seated on the seat 58 at the first opening 34.

In a non-limiting exemplary embodiment, the ball guide 22 is also configured as a check valve having a seat 60 disposed at the opening 48 at the second end 44 of the ball guide 22. In some embodiments, the seat 60 is structurally, operationally, and functionally substantially similar to the seat 58. As such, the seat 60 is also defined at least in part by a relatively sharp-edged hard perimeter, substantially similar to perimeter 88, against which the ball 54 is sealingly seated. In some embodiments, the perimeter of the seat 60 is defined at least in part by a radiused or chamfered edge along at least a portion thereof against which the ball 54 gets sealingly seated.

In a non-limiting exemplary embodiment, the ball 54 disposed within the ball guide 22 is a compliant ball substantially similar to the compliant ball 28. As such, the compliant ball 54 is also defined at least in part by a compliant coating substantially similar to compliant coating 72 encasing a substantially rigid core such as rigid core 74. Accordingly, when the compliant ball 54 is displaced towards the opening 48 at the second end 44 of the ball guide 22 and sealingly seated on the seat 60, the flow of material across the opening 48 is inhibited. Conversely, material will flow across the opening 48 at the second end 44 of the ball guide 22 when the compliant ball 54 is displaced away from the opening 48 and unseated from the seat 60.

FIG. 5 illustrates a non-limiting exemplary embodiment of a generic check valve 100 of the instant disclosure. The check valve 100 is defined at least in part by a substantially hollow valve body 102 having a first and a second section 104 and 106, respectively, and an aperture 108 through which the first and second sections 104 and 106 are in fluid communication with each other. The check valve 100 also includes a seat 110 at the aperture 108, and a plug 112 disposed, for example, in the first section 104. In some embodiments, the seat 110 and the plug 112 are configured for sealingly seating the plug 112 along a perimeter 114 of the seat 110 at the aperture 108 for inhibiting flow of material thereacross. Accordingly, the aperture 108 and the plug 112 are dimensioned or configured for inhibiting the displacement of the plug 112 across the aperture 108, i.e., the plug 112 cannot dislocate from the first section 104 into the second section 106. The first section 104 is configured for uninhibited displacement of the plug 112 disposed therewithin. Thus, as will be apparent to one having ordinary skill in the art, the check valve 100 is configured to operate or function in a manner whereby when the plug 112 is unseated from the seat 110 and displaced away from the aperture 108, material may flow across the aperture 108 between the first and second sections 104 and 106. Accordingly, when the pressure in the second section 106 is relatively higher than the pressure in the first section 104, the plug 112 will un-seat from the seat 110, and will be displaced away from the aperture 108. Consequently, material will flow across the aperture 108 from the second section 106 to the first section 104. Conversely, the flow of material across the aperture 108 between the first and second sections 104 and 106 is inhibited when the plug 112 is sealingly seated on the seat 110. Accordingly, when the pressure in the first section 104 is relatively higher than the pressure in the second section 106, a pressure acting on the plug 112 will displace the plug 112 towards the aperture 108 to seat on the seat 110 and close the aperture 108. Consequently, material will be inhibited from flowing across the aperture 108 from the first section 104 to the second section 106.

In a non-limiting exemplary embodiment, the plug 112 is a compliant ball defined at least in part by a substantially compliant coating 116 encasing a substantially rigid core 118. In certain embodiments, the compliant coating 116 is an elastomeric material. In some embodiments, when the compliant ball, i.e., the plug 112 is seated on the seat 110, at least a portion 120 of the compliant coating 116 seated along or in contact with the perimeter 114 of the seat 110 deforms at least partially to form a seal therearound to inhibit the flow of material across the aperture 108. In some embodiments, the deformation of the compliant coating 116 enhances the integrity of the seal at the aperture 108, i.e., the seal between the seat 110 and the plug, or the compliant ball, 112. In certain non-limiting exemplary embodiments, a thickness of the compliant coating 116 relative to a size of the substantially rigid core 118 is optimized for one or more of weight, sealing effectiveness, and life of the compliant coating 116.

In a non-limiting exemplary embodiment, either one or both balls 28 and 54 are structurally configured and are operationally and functionally substantially similar to the plug 112. In other words, as described with reference to FIG. 4, either one or both balls 28 and 54 are defined at least in part by a compliant coating 72 encasing a substantially rigid core 74. Accordingly, the compliant ball 28, as with plug 112 for example, will sealingly close the first end 30 of the ball cage 20 when seated on the seat 58 at the first end 30. Likewise, the compliant ball 54, as with the plug 112 for example, will sealingly close the second end 44 of the ball guide 22 when seated on the seat 60 at the second end 44.

In a non-limiting exemplary embodiment, the seat 110 of the check valve 100 is defined at least in part by a relatively hard sharp-edge along at least a portion of its perimeter 114 against which the plug, i.e., the compliant ball, 112 is seated. Accordingly, in certain embodiments, the seats 58 and 60 at the first opening 34 and the opening 48 are defined at least in part by a relatively hard sharp-edge along at least a portion of their respective perimeters against which the corresponding compliant ball 28 and 54 is seated. In a non-limiting exemplary embodiment, the seat 110 of the check valve 100 is defined at least in part by a radiused or chamfered edge (not shown) along at least a portion of its perimeter 114 against which the plug, i.e., the compliant ball, 112 is seated. Accordingly, in some embodiments, one or more of the seats 58 and 60 at the first opening 34 and the opening 48 are defined at least in part by a radiused or chamfered edge along at least a portion of their respective perimeters against which the corresponding compliant ball 28 and 54 is seated.

Referring to FIG. 3A, in some embodiments, the plurality of posts 46 of the ball guide 22 are spaced apart from each other such that the compliant ball 54 cannot move unassisted into or out of the interior 52 of the ball guide 22. In certain embodiments, the compliant coating, such as compliant coating 72, of the compliant ball 54 deforms sufficiently when an operator pushes the compliant ball 54 into and out of the interior 52. In certain embodiments, each of the plurality of posts 46 are substantially rigid. In some embodiments at least one of the plurality of posts 46 is sufficiently flexible or compliant such that the compliant ball 54 can be pushed past the at least one flexible post. In certain embodiments, opposing side 80a and 80b of at least two adjacent posts 82a and 82b include opposing contoured sections 84a and 84b. As such, a contoured opening 86, defined at least in part by the opposing contoured sections 84a and 84b, is provided through which the compliant ball 54 can be removed from the interior 52, in some embodiments after the ball stop 56 is removed from the ball guide 22 ball 54 is allowed to travel through the contoured opening 86. In some embodiments, only one of the plurality of posts 46 is contoured.

Referring to FIG. 1A, the pump 10, in a non-limiting exemplary embodiment, includes a substantially hollow middle section 24 extending between the outlet section 14 and the ball cage 20. The middle section 24 is in fluid communications with the outlet section 14 and with the second opening 36 in the second end 32 of the ball cage 20. In certain embodiments, where the pump 10 does not include the ball cage 20, the substantially hollow middle section 24 extends between, and is in fluid communication with, the outlet and inlet sections 14 and 18, respectively.

In a non-limiting exemplary embodiment, the pump 10 includes a piston 26 configured for rectilinear displacement. The piston 26, in some embodiments, includes spaced-apart opposing first and second ends, 92 and 94, respectively. The first end 92 is operatively coupled with a prime mover (not shown) configured for displacing or operating the piston 26. The second end 94 of the piston 26 and the first end 42 of the ball guide 22 are operatively coupled such that a rectilinear displacement of the piston 26 imparts a rectilinear displacement of the ball guide 22.

Figure 6A:
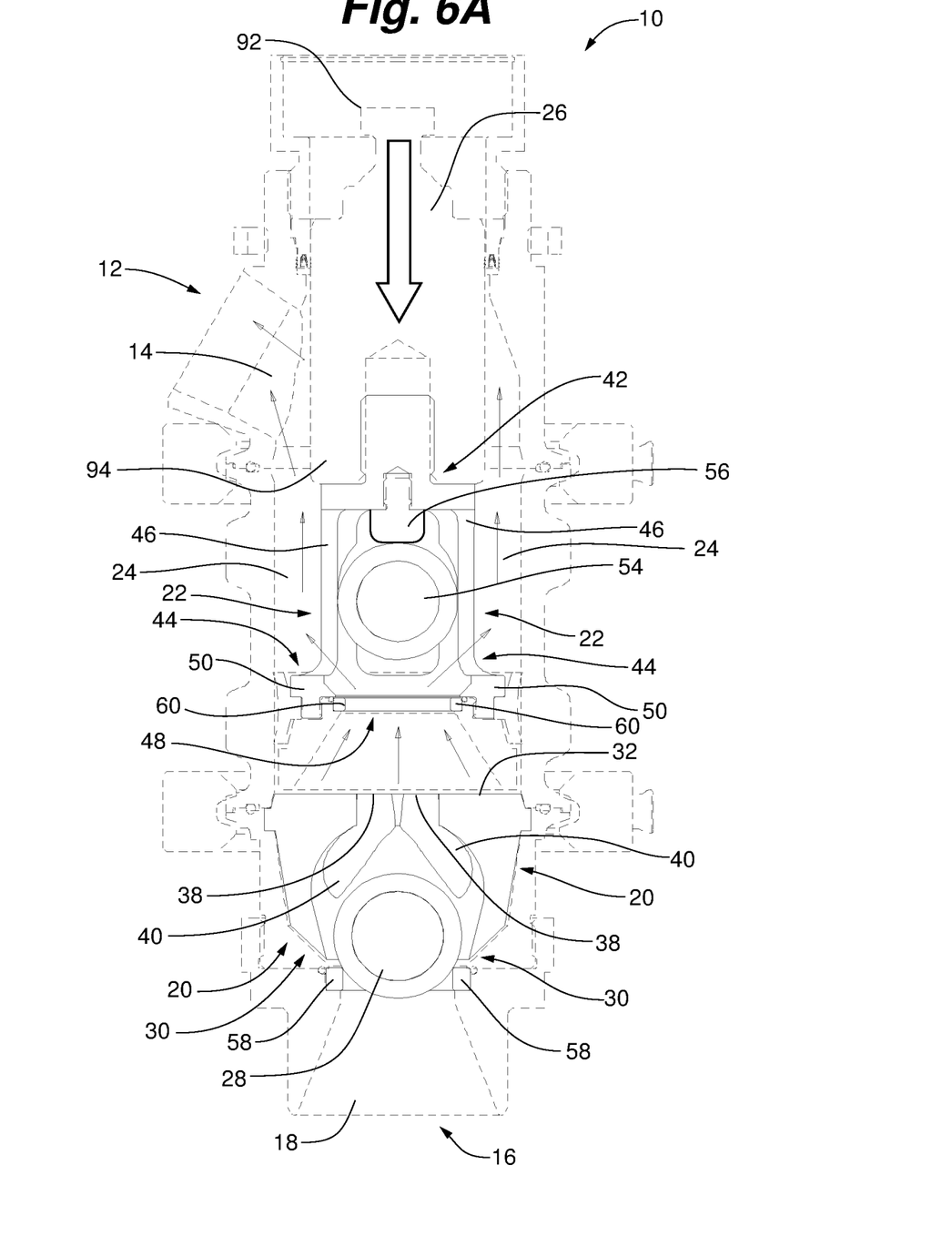
FIG. 6A is a side cross-sectional view of the pump illustrated in FIGS. 1A and 1B during movement of the ball guide towards the ball cage.

In accordance with a non-limiting exemplary embodiment, the pump 10 may be used for pumping fillers or aggregates or cementitious material and the like. FIG. 6A illustrates an exemplary operation of the pump 10 during a displacement of the ball guide 22 towards the ball cage 20, for example due to a displacement of the piston 26. Accordingly, the material between the ball cage 20 and the second end 44 of the ball guide 22, i.e., the material in the middle section 24, will get compressed. Consequently, a pressure applied on the ball 28 in the first direction displaces the ball 28 in the first direction towards the first opening 34 and sealingly seats the ball 28 on the perimeter 88 of the seat 58 to inhibit flow of material into the pump 10 from the inlet port 16. Concurrently, a pressure applied on the ball 54 displaces the ball 54 away from the opening 48 at the second end 44 of the ball guide 22. The compressed material flows through the opening 48 at the second end 44 of the ball guide 22, through the openings between the plurality of posts 46 of the ball guide 22, into the outlet section 14. The at least one or more seals (not shown) along the entire outer perimeter 50 of the second end 44 of the ball guide 22 inhibit flow of material across the outer perimeter 50. At least a portion of the material in the outlet section 14 may flow out of the pump 10 through the outlet port 12.

Figure 6B:
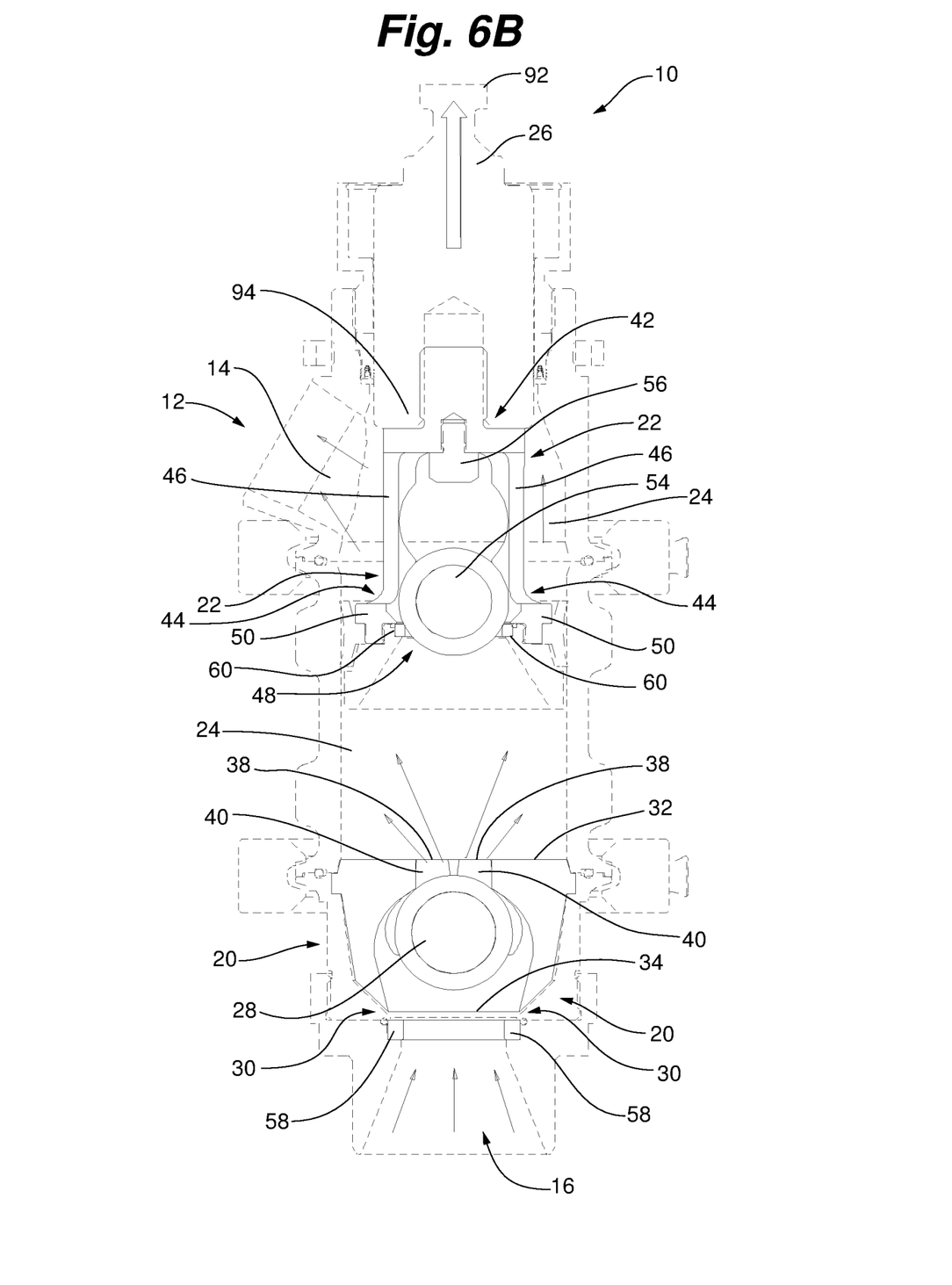
FIG. 6B is a side cross-sectional view of the pump illustrated in FIGS. 1A and 1B during movement of the ball guide away from the ball cage.

In the reverse cycle, such as that illustrated in FIG. 6B, the piston 26 displaces the ball guide 22 towards the outlet section 14, whereby at least a partial vacuum is created between the second end 32 of the ball cage 20 (or the inlet section 18) and the second end 44 of the ball guide 22, i.e., within the middle section 24. The at least one or more seals (not shown) along the entire outer perimeter 50 of the second end 44 of the ball guide 22 inhibits leakage thereacross, thus aiding in creating the at least partial vacuum. The ball 28 is displaced towards, and positioned over, the second opening 36 at the second end 32 of the ball cage 20, and the ball 54 is displaced towards, and sealingly seated on, the perimeter of the seat 60 at the opening 48 at the second end 44 of the ball guide 22. In addition to the at least partial pressure acting on the ball 28, the material flowing into the pump 10 through the inlet port 16 also acts on the ball 28 to displace the ball 28 towards the second opening 36 at the second end 32 of the ball cage 20. In addition thereto, material in the section between the second end 44 of the ball guide 22 and the outlet port 12 gets compressed and exerts a pressure on the ball 54 displacing the ball 54 towards the opening 48 in the second end 44 of the ball guide 22. Positioning the ball 28 on at least a portion of the second opening 36 creates the one or more smaller openings 38 in the second end 32 of the ball cage 20, and defines the one or more passages 40 between the first opening 34 at the first end 30 of the ball cage 20 and the one or more smaller openings 38 at the second end 32 of the ball cage 20. The material entering the pump 10 through the inlet port 16 flows along the one or more passages 40 and through the one or more smaller openings 38 into the section of the pump between the ball cage 20 and the ball guide 22, i.e., into the middle section 24. Concurrently, the material between the second end 44 of the ball guide 22 and the outlet section 14 is pushed out of the pump 10 through the outlet port 12.

In view thereof, modified and/or alternate configurations of the embodiments described herein may become apparent or obvious. All such variations are considered as being within the metes and bounds of the instant disclosure. For instance, while reference may have been made to particular feature(s) and/or function(s), the disclosure is considered to also include embodiments configured for functioning and/or providing functionalities similar to those disclosed herein with reference to the accompanying drawings. Accordingly, the spirit, scope and intent of the instant disclosure is to embrace all such variations. Consequently, the metes and bounds of the disclosure is solely defined by the appended claims and any and all equivalents thereof.

What is claimed is:

1. A pump (10) for pumping heavily filled material containing a fluid and heavy fillers, aggregates, cementitious material, or similar constituents that can separate under pressure, the pump comprising:
   an outlet port (12);
   an outlet section (14) in fluid communication with the outlet port;
   an inlet port (16);
   a ball cage (20), comprising:
     a first ball (28) disposed therewithin;
     spaced apart opposing first and second ends (30, 32) that operate as ball stops for the first ball (28);
     a first opening (34) at the first end (30) of the ball cage, the first opening in fluid communication with the inlet port; and
     a second opening (36) at the second end (32) of the ball cage, wherein the second opening (36) has a central portion and plurality of circumferentially spaced smaller openings (38) extending outward from the central portion, wherein when the first ball is stopped by the second end, the central portion of the second opening (36) is blocked by the first ball (28) and the smaller openings (38) are not blocked by the first ball (28);
     a plurality of passages (40) within the ball cage, each passage (40) being connected at one end to one of the plurality of smaller openings (38) and each passage being defined at least in part by the first ball and by an inner wall of the ball cage (20), so that material entering the pump (18) through the inlet port (16) flows into the ball cage (20) through the first opening (34) and along the passages (40) to exit the ball cage (20) through the smaller openings (38) of the second opening (36) at the second end (32), wherein a cross-sectional area of the passages decreases with increasing distance from the first opening (34), so that a velocity of material flowing through the passages (40) increases with increasing distance from the first opening (34) to the smaller openings (38) of second opening (36) at the second end (32) of the ball cage (20);
wherein the increase in the velocity flushes away compressed or hardened material out of the ball cage to prevent packing out; and
wherein, the ball cage is configured for uninhibited displacement of the first ball within the ball cage between the first and second ends (30, 32);
a first seat (58) at the first end of the ball cage (20); and
a substantially hollow middle section (24) extending between the outlet section (14) and the ball cage (20), the middle section (24) in fluid communications with the outlet section (14) and with the second opening (36);
wherein material flows from the inlet port (16) through the first opening (34) into the passages (40) and through the second opening (36) into the middle section (24);
wherein a pressure applied on the first ball in a first direction sealingly seats the first ball on the seat, thereby inhibiting flow of material across the first opening;
wherein a pressure applied on the first ball in a second direction unseats the first ball from the seat and positions the first ball on the central portion of the second opening;
wherein material in the middle section flows into the outlet section; and
wherein material in the outlet section flows out of the pump through the outlet port.

2. The pump of claim 1, wherein the pressure in the second direction is due to one or more of:
a pressure in the ball cage that is relatively higher than a pressure in the middle section;
a pressure at the inlet port that is relatively higher than the pressure in the ball cage; and
flow of material from the inlet port into the ball cage through the first opening.

3. The pump of claim 1, wherein the increase in the velocity flushes away compressed or hardened material out of the ball cage to prevent packing out.

4. The pump of claim 1, wherein material in the outlet section flows out of the pump through the outlet port.

5. The pump of claim 1, wherein the first ball comprises a substantially compliant coating (72) encasing a substantially rigid core (74).

6. The pump of claim 1, further comprising:
an inlet section (18) in fluid communication with the inlet port; wherein the middle section (24) extends between and in fluid communication with the inlet and outlet sections;
a ball guide (22) comprising a second ball (54) disposed therewithin; and
a piston (26) configured for displacing the ball guide towards and away from the ball cage (20).

7. The pump of claim 6, further comprising:
a second seat (60) disposed at an end of the ball guide;
wherein,
the first ball disposed within the ball cage is a compliant ball;
the ball cage, the first ball disposed therewithin, and the seat disposed at an end of the ball cage are configured as a check valve;
the second ball disposed within the ball guide is a compliant ball; and
the ball guide, the second ball disposed therewithin, and the seat disposed at an end of the ball guide are configured as a check valve.

8. The pump of claim 7, wherein each of the compliant first and second balls disposed within the ball cage and the ball guide, respectively comprises:
a substantially rigid core (74); and
a compliant coating (72) encasing the rigid core.

* * * * *